Dec. 31, 1946.     A. L. ELLIS     2,413,301
POWER TRANSMISSION
Filed Jan. 14, 1936     7 Sheets-Sheet 1

FIG_1

INVENTOR
ARTHUR L. ELLIS
BY
Ralph L. Tweedale
ATTORNEY

FIG_2

Dec. 31, 1946.   A. L. ELLIS   2,413,301
POWER TRANSMISSION
Filed Jan. 14, 1936   7 Sheets-Sheet 4

INVENTOR
ARTHUR L. ELLIS
BY
Ralph L. Tweedale
ATTORNEY

Dec. 31, 1946.     A. L. ELLIS     2,413,301
POWER TRANSMISSION
Filed Jan. 14, 1936     7 Sheets-Sheet 5

INVENTOR
ARTHUR L. ELLIS
BY
*Ralph L. Tweedale*
ATTORNEY

Dec. 31, 1946.　　　　A. L. ELLIS　　　　2,413,301
POWER TRANSMISSION
Filed Jan. 14, 1936　　　　7 Sheets-Sheet 7

FIG_8_

FIG_10_

FIG_9_

INVENTOR
ARTHUR L. ELLIS
BY
Ralph L. Tweedale
ATTORNEY

Patented Dec. 31, 1946

2,413,301

UNITED STATES PATENT OFFICE 2,413,301

POWER TRANSMISSION

Arthur L. Ellis, Deep River, Conn., assignor, by mesne assignments, to Vickers Incorporated, Detroit, Mich., a corporation of Michigan Application January 14, 1936, Serial No. 59,072

16 Claims. (Cl. 60—53)

This invention relates to power transmissions, particularly to control devices for power transmissions of the variable speed type for transmitting power from a driving member to a driven member at any speed ratio therebetween. With power transmissions in which a positive and non-yielding drive is provided, such, for example, as the well-known hydraulic type of transmission, the application of an excessive resisting load on the driven member transmits an overload to the prime mover which operates the driving member unless some provision is made for preventing this. Should such an excessive load be imposed on the driven member while the ratio of power transmission is such that the driven member moves at a high speed relative to the driving member, the mechanical advantage of the driving member in overcoming this load is small, so that the prime mover becomes easily overloaded under these conditions.

Since the variable speed power transmission in itself provides a means for increasing the mechanical advantage of the driving member over the driven member, it is an object of the present invention to provide control means operative to change the ratio of power transmission upon the occurrence of an excessive load on the driven member in such a way that the power transmission itself will act to prevent transmission of the overload to the driving member.

A further object is to provide in a power transmission of the character described a control means responsive to the application of a predetermined amount of torque to the driving member for increasing the mechanical advantage of that member over the driven member.

A further object is to provide a novel control system of the character described including a fluid motor having a differential piston and a pair of control valves therefor, one of which is operable to determine the operativeness or non-operativeness of the piston and the other of which is operable to determine its direction of movement.

Further objects and advantages of the present invention will be apparent from the following description, reference being had to the accompanying drawings wherein a preferred form of the present invention is clearly shown.

Figures 8, 10:
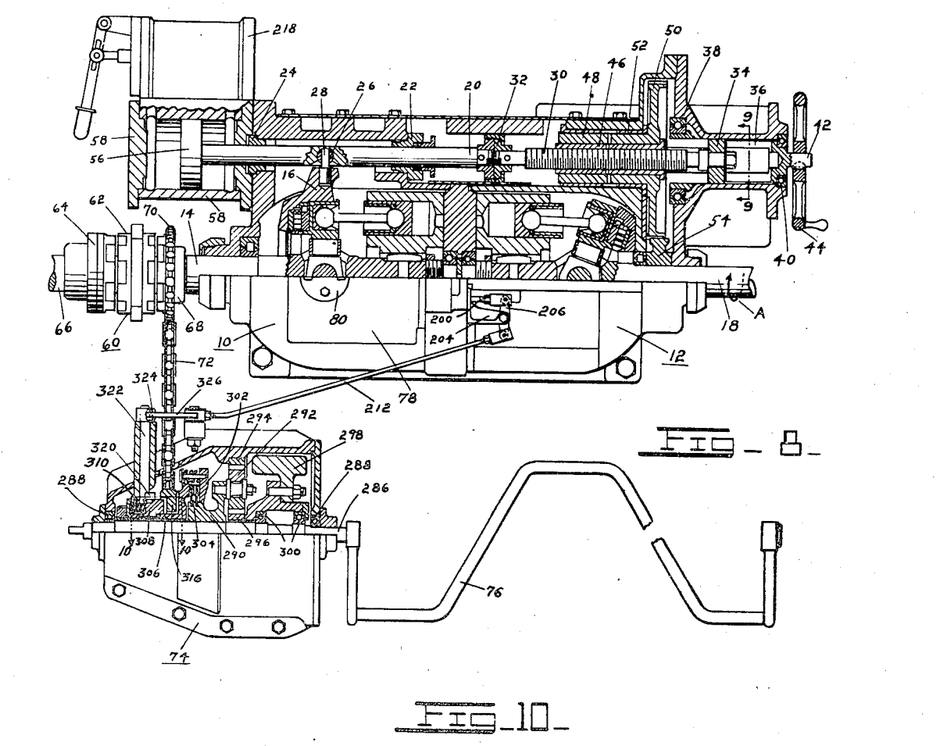
Fig. 8 is a top view partly in section of the power transmission mechanism and a portion of the control system.
Fig. 10 is a fragmentary sectional view on line 10—10 of Fig. 8.
Figure 9:
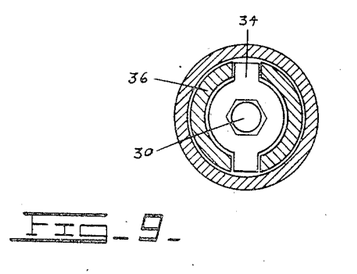
Fig. 9 is a fragmentary sectional view on line 9—9 of Fig. 8.

Referring now to Fig. 8, there is illustrated a power transmission of the well-known "Waterbury" type comprising a variable displacement pump or "A-end" 10 and a fixed displacement hydraulic motor or "B-end" 12. Transmissions of this character are fully described in the patents to Williams 1,044,838 and to Janney 1,020,285, so that it is unnecessary to describe the construction of the transmission itself in detail. For the purpose of this specification it may be stated that the "A-end" 10 comprises a drive shaft 14, rotation of which causes fluid to be pumped to the "B-end" 12. The displacement of the pump and consequently the quantity of fluid pumped per revolution of shaft 14 are regulated by a tilting box 16 which is shown in the neutral position. Movement of the tilting box in a clockwise direction away from the neutral position produces forward rotation of the "B-end" and its driven member 18 (arrow A), while movement of the tilting box counter-clockwise away from the neutral position causes rotation of the driven member 18 in the opposite direction. While the position of the tilting box 16 may be controlled in any suitable manner, in the form of the invention illustrated, a control mechanism of the type shown in the patent to Janney 1,220,424 is utilized and includes a non-rotative rod 20 mounted for sliding movement in bearings 22 and 24 and having a sliding and pivoting connection at 26 with a stud 28 on the tilting box 16. A screw shaft 30 is connected to the shaft 20 by a swivel 32 and at its opposite end carries a splined head 34 which is slidable but not rotatable relative to a slotted sleeve 36 (see Fig. 9). The sleeve 36 is journalled on bearings 38 and 40 and has a projecting shaft 42 upon which is mounted a hand wheel 44 by which the screw shaft 30 may be rotated. The screw shaft 30 is threaded into a rotatable nut 46 rigidly secured in the hub 48 of a gear 50 which in turn is journalled in a bearing 52 by which the nut and gear are held against axial movement. The pitch of the threads of shaft 36 is sufficiently great as to make the thread reversible. That is, the shaft 30 may be threaded into or out of nut 46 by pushing or pulling on the shaft 20, the shaft 30 turning in swivel 32 and in nut 46. Gear 50 meshes with a pinion 54 rigidly secured to the "B-end" driven shaft 18. The left-hand end of the rod 20 carries a differential piston 56 operating in a cylinder 58 by which the rod 20 and tilting box 16 may be operated directly with fluid under pressure.

An "A-end" driving shaft 14 carries a double clutch 60 having a movable member 62 splined to the shaft 14 and slidable to engage either a clutch member 64 rigidly secured to a shaft 66 or a clutch member 68 rotatably mounted on the shaft 14. The shaft 66 may be that of any suitable prime mover, for example an electric motor, not shown, and is used for normally driving the power transmission. The clutch member 68 carries a sprocket 70 which is driven by a chain 72 from a manual drive clutch unit 74 by which the "A-end" may be driven by hand from a hand crank 76 upon failure of power at the shaft 66.

Figures 4, 7:
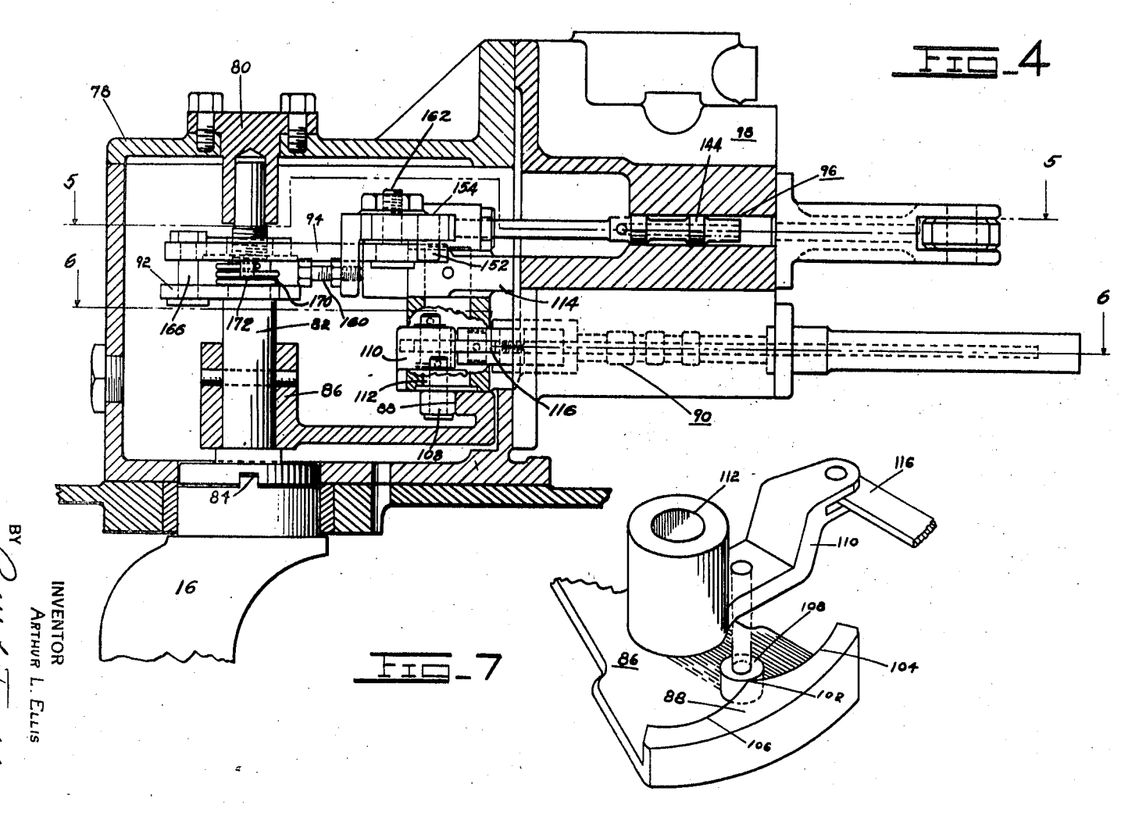
Fig. 4 is a fragmentary cross section on line 4—4 of Fig. 5 showing the control valves with their operating mechanisms partly in elevation.
Fig. 7 is a fragmentary perspective view of a portion of the valve control mechanism.

Means for moving the tilting box toward neutral position upon occurrence of an overload is provided and includes a housing 78 mounted on top of the "A-end" directly over the upper trunnion upon which the tilting box 16 is mounted. Referring now to Fig. 4 the housing 78 carries a removable bearing 80 within which a stub shaft 82 is mounted. The lower end of the shaft 82 is adapted to be coupled directly to the tilting box by means of a keyway 84. Shaft 82 has rigidly secured thereto an arm 86 carrying a cam 88 for the purpose of controlling a constant horsepower control valve generally designated at 90. Shaft 82 also carries an arm 92 having a lost motion connection with a cam bar 94 for the purpose of operating a directional control valve generally designated at 96. The valves 90 and 96 are formed within a valve block 98 secured to one side of the housing 78. Valve block 98 also includes a constant torque valve 100 (Fig. 5) which is operated from the clutch unit 74 shown in Fig. 8.

Figure 6:
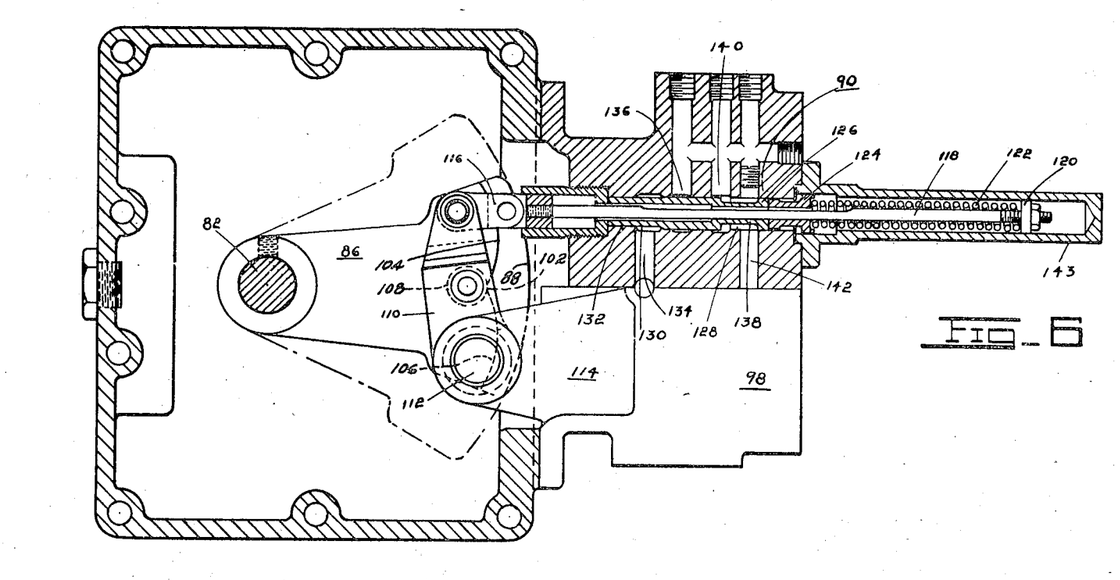
Fig. 6 is a cross section on line 6—6 of Fig. 4.

Referring now to Figs. 6 and 7, cam 88 is formed with a high portion 102 at its mid-part corresponding to neutral position of the tilting box 16 and curved portions 104 and 106 sloping away from the high part 102 symmetrically on either side thereof. A roller cam follower 108 is pivoted on a lever 110, the latter being pivoted at 112 in a bracket 114 formed on the valve block 98. The outer end of the lever 110 carries a link 116 pivotally connected to a tension rod 118 having an adjustable spring plate 120 at its outer end abutting a spring 122. The spring plate 120 is moved to the right in Fig. 6 whenever the arm 86 moves away from the neutral position illustrated, thus decreasing the compression of the spring 122. The left-hand end of spring 122 abuts against a spool 124 which in turn abuts against a valve member 126 slidably mounted within a bore 128 formed in the valve block 98. The left-hand end of the valve member 126 is reduced in diameter at 130 to fit a reduced portion 132 of the bore 128. There is thus provided a small area against which fluid pressure may be exerted through a port 134 to counteract the force of the spring 122 and to move the valve 126 to the right in Fig. 6. A port 136 is provided leading to the bore 128 and is so positioned that a predetermined amount of movement of the valve 126 to the right opens a connection between the port 134 and the port 136. The valve 126 is also provided with a reduced portion 138 which is adapted to connect a port 140 with a port 142 in the position illustrated and to close off the port 140 when valve 126 moves to the right sufficiently to open port 136. A closure 143 protects the spring 122 and seals the end of bore 128.

Figure 5:
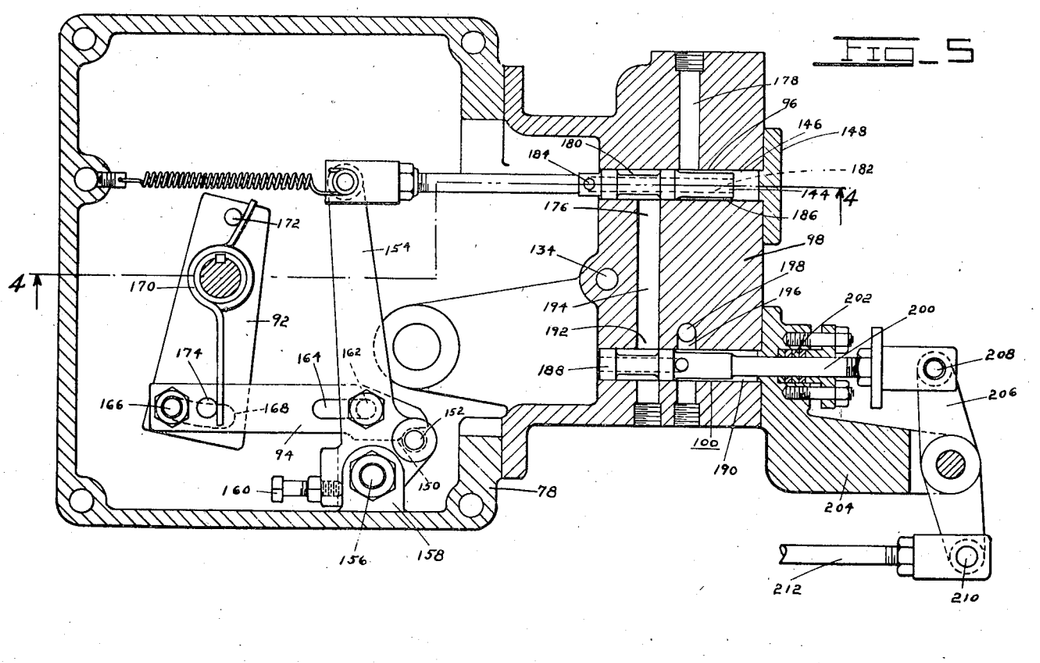
Fig. 5 is a cross section on line 5—5 of Fig. 4.

Referring now to Fig. 5, the directional control valve 96 includes a valve member 144 slidable in a bore 146 formed in the valve block 98 and having an end closure 148 at its outer end. The valve member 144 is operated from the arm 92 by means of the cam bar 94 having a cam portion 150 which cooperates with a pin 152 formed on a lever arm 154. The arm 154 is pivoted at 156 to a bracket 158 formed in the housing 78 and carries an adjustable stop screw 160 for determining the left-hand position of the valve 144. The arm 154 also carries a pin 162 which projects through a slot 164 in the bar 94 for the purpose of preventing the cam bar 94 from lifting away from the pin 152 and also for positively moving the arm 154 to the left when the cam bar 94 reaches the left-hand limit of its travel. The cam bar 94 is connected to the arm 92 by means of a pin 166 carried by the cam bar 94 and a slot 168 formed in the arm 92. A spring 170 abuts against a pin 172 on the arm 92 and a pin 174 on the cam bar 94 and tends to keep pin 166 in the left-hand end of slot 168.

The mechanism is so arranged and adjusted that in the position illustrated which corresponds to neutral position of the tilting box 16 the valve 144 is maintained in its left-hand position by the spring 170 acting through the pin 174, cam bar 94, the right-hand end of the slot 164, the pin 162, and the lever 154. Movement of the arm 92 away from the position illustrated in a clockwise direction in Fig. 5 does not move the cam bar 94 but merely increases the tension in the spring 170; the slot 168 permitting clockwise overtravel of the arm 92. Should the arm 92 move counter-clockwise away from the position illustrated, the left-hand end of slot 168 abuts pin 166 moving cam bar 94 to the right. Cam 150 thus moves the pin 152 downwardly causing a clockwise movement of the arm 154 and moving valve 144 to the right. The construction is such that the complete travel of valve 144 takes place in a very small angle of movement of the arm 92 as compared with its total movement.

The bore 146 of the valve 144 has a port 176 at its left-hand end and a port 178 to the right thereof. Valve 144 is formed with a reduced portion 180 adapted to connect the ports 176 and 178 when the valve is moved to the right. A bore 182 is formed centrally of the member 144 and connects by means of a cross bore 184 the right-hand end of the bore 146 with the interior of the housing 78. In the position illustrated in Fig. 5, the port 178 is in communication with the right-hand end of the bore 146 by means of a reduced portion 186 formed on the valve member 144 and is, therefore, in communication with the interior of the housing 78 when the valve is in the position shown. This communication is cut off by the valve 144 being moved to the right.

The constant torque valve 100 includes a valve member 188 slidably mounted within a bore 190. The bore 190 is formed with a port 192 communicating with the port 176 through a conduit 194 and a port 196 communicating with the port 142 of valve 90 through a conduit 198. The valve 188 is formed similarly to the valve 144 except that it is operated by means of a stem 200 projecting outwardly from the valve block 98 through a packing gland 202. A bracket 204 carries a lever 206 having pivotal connection at 208 with the stem 200 and at 210 with an operating rod 212. In the position illustrated in Fig. 5 the valve 188 closes off communication between ports 192 and 196 and connects port 196 to the interior of housing 78. When the valve is moved to the right, the ports 192 and 196 are connected together and port 196 is cut off from communication with the housing 78.

The clutch unit 74 illustrated in Fig. 8 includes a main shaft 286 carried in bearings 288 and rigidly secured to the crank 76. Shaft 286 carries a hub 290 rigidly secured thereto which drives a set of planetary pinions 292 cooperating with a fixed ring gear 294 and a sun pinion 296. The sun pinion 296 is rigidly secured to a flywheel 298 journalled on the shaft 286 by means of bearings 300. The hub 290 also carries a driving part 302 of a spring loaded friction clutch 304. The driven part of the clutch 304 comprises a hub member 306 freely rotatable on shaft 286. The hub member 306 has splined thereto a cam member 308 (see Fig. 10) which is spring pressed to the right by springs 310. The cam member 308 has a projection 312 engaging with a cam surface 314 formed in the hub of a sprocket 316 which is mounted on the hub member 306 so as to be rotatable relative thereto. Cam member 308 has a slot 318 formed therein for engagement with a fork 320 which is pivotedly mounted on a shaft 322. Shaft 322 has a lever 324 connected by means of a linkage 326 to the operating rod 212 for the constant torque valve 100.

It will be seen that the crank 76 is directly geared to the flywheel 298 in a manner to cause the flywheel to revolve at a greater rate of speed than the crank 76. The clutch 304 connecting the shaft 286 to the rotatable hub 306 is arranged to slip when a predetermined amount of torque is applied thereto. The force of the springs 310 is so proportioned relative to the torque transmitted by the clutch 304 that the projection 312 may move substantially half the length of the cam surface 314 before springs 310 are compressed sufficiently to require a torque greater than the maximum transmitted by clutch 304 for further travel of the member 312 along the cam surface 314. Thus, whenever the load applied to the sprocket 316 is sufficiently great to cause clutch 304 to slip, the sprocket 316 must have moved relative to hub 306 an amount sufficient to move the cam member 308 to the left a predetermined amount. This movement of the member 308 is transmitted through the slot 318, fork 320, shaft 322, lever 324, linkage 326, to the operating rod 212 for the constant torque valve 100.

Figure 1:
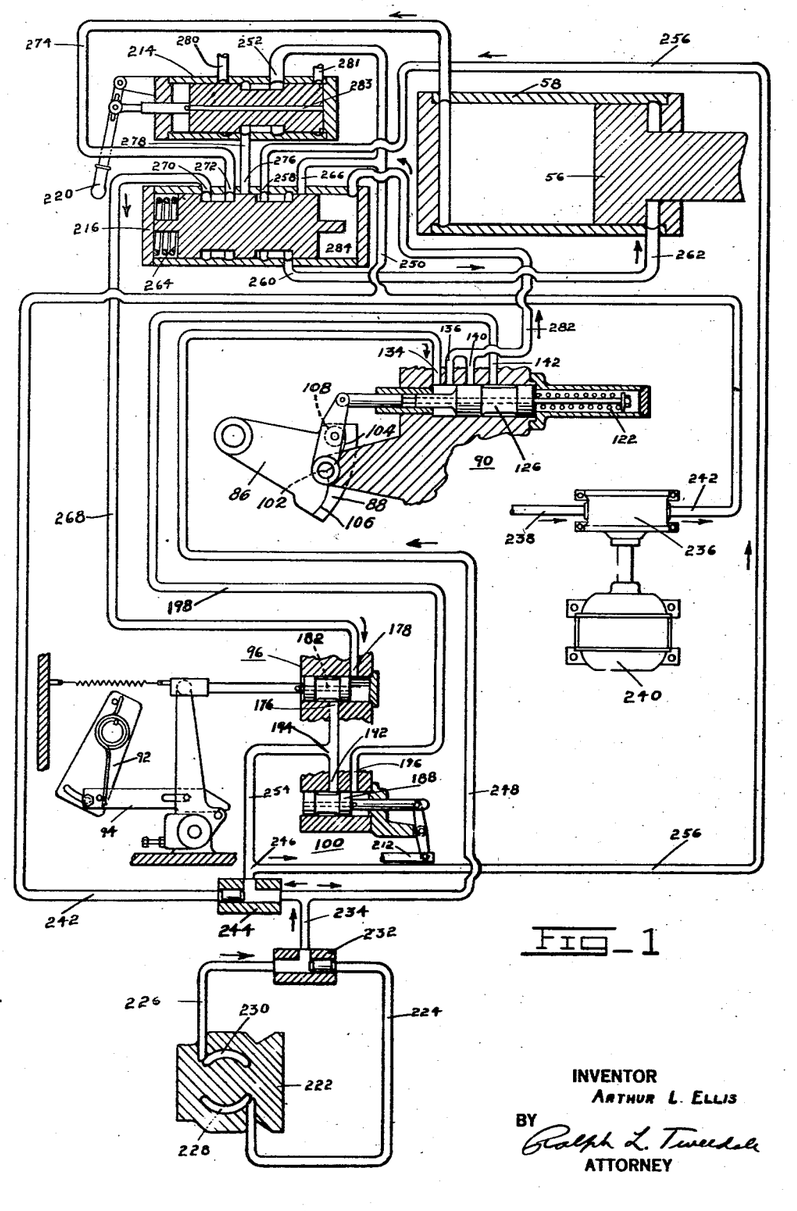
Fig. 1 is a diagrammatic illustration of a fluid circuit embodying one form of the present invention.

Referring now to Fig. 1, the hydraulic circuit for the control mechanism of the present invention includes the mechanism above described, and in addition, a pilot control valve 214 and a hydraulically operated valve 216 both of which are formed in a second valve block 218 formed in the body of the cylinder 58 (see Fig. 8). The pilot control valve 214 may be operated by a hand lever 220 or by any suitable automatic mechanism desired, and is arranged to move the piston 56 and tilting box 16 to the right when in the position illustrated, and to move the same to the left when the valve 214 is moved to the limit in the left-hand direction. An intermediate position is provided in which the piston 56 is hydraulically locked against movement. The valve 216 is operated in response to the constant horsepower valve 90 and the constant torque valve 100 to move the piston 56 and the tilting box 16 toward neutral position irrespective of the position of valve 214 or, when the hand wheel 44 is being used for normal control, with sufficient force to overcome the greatest manual effort which can be applied to wheel 44.

Fluid under pressure for operating the piston 56 under the joint control of the valves 90, 96, 100, 214, and 216 is provided from two alternate sources: The first is the power circuit of the hydraulic transmission itself the valve plate thereof being indicated at 222. Conduits 224 and 226 connect with each of the two valve ports 228 and 230, respectively, and lead to a shuttle valve 232 for the purpose of connecting a conduit 234 with whichever of the conduits 224 and 226 has a higher pressure at a given instant. The other source comprises an auxiliary pump 236, of any suitable construction, having an intake 238 leading from the expansion tank, not shown, and having a relief valve, not shown, which are customarily provided with hydraulic systems of this character. Pump 236 may be driven, for example, by an electric motor 240. Pump 236 has an outlet conduit 242 communicating with a shuttle valve 244 for the purpose of selectively delivering to a conduit 246 fluid from either conduit 234 or conduit 242 depending upon which has a higher pressure at a given instant.

The conduit 234 has a branch 248 leading to the port 134 of the constant horsepower valve 90 while the conduit 242 has a branch 250 leading to the port 252 of the valve 214. Conduit 246 communicates by means of a branch 254 with the conduit 194 connecting ports 176 and 192 of valves 96 and 100 respectively, and has a second branch 256 leading to a port 258 of the valve 216. Valve 216 is formed with a port 260 communicating by means of a conduit 262 with the small end of the cylinder 58 and, in the position of the valve 216 illustrated, the ports 258 and 260 are connected. When the valve 216 is moved to the right by a spring 264, the port 260 is cut off from communication with the port 258 and placed in communication with a port 266 communicating with the conduit 250.

The port 178 of valve 96 communicates by means of a conduit 268 with a port 270 of the valve 216. In the position illustrated in Fig. 1 the valve 216 is arranged to connect the port 270 with a port 272 leading by means of a conduit 274 to the large end of the cylinder 58. When the valve 216 is moved to the right as in Fig. 3, port 272 is cut off from communication with port 270 and connected with a port 276 leading to a port 278 of the valve 214. Port 278 is connected with the port 252 by the valve 214 in the position illustrated in Fig. 1. When valve 214 is moved to its mid-position, the port 278 is cut off from communication with any port in the valve 214. When moved to the limit of its travel to the left, valve 214 connects port 278 with a port 280 leading to the expansion tank, not shown. Conduits 281 and 283 connect the opposite ends of the valve 214 to the expansion tank to eliminate trapping effects. The ports 136 and 140 of valve 90 are connected together by means of a conduit 282 leading to an operating cylinder 284 at the right-hand end of valve 216 for overcoming the force of the spring 264 and moving the valve 216 into the position illustrated in Figures 1 and 2.

In operation, the transmission being suitably assembled with the shaft 66 connected to a prime mover, preferably one of constant speed, and the shaft 18 being connected to a load which it is desired to drive at variable speeds, the clutch 60 is shifted to engage the clutch member 64. If it is desired to operate the "B-end" shaft 18 and the load to a predetermined position, that is by "follow-up" control the hand wheel 44 is turned causing the screw shaft 30 to move axially in the nut 46 moving the tilting box out of neutral position. Fluid is thus pumped from the "A-end" to the "B-end" and the latter operating as a fluid motor turns the shaft 18 and the load. This movement of shaft 18 turns the nut 46 through the gears 50 and 54 in a direction tending to move the screw shaft 30 back into the position corresponding to neutral position of the tilting box in the manner more fully described in the Janney Patent 1,220,424. So long as handwheel 44 is turned the "B-end" shaft 18 will continue to turn at a corresponding speed and direction.

Figure 3:
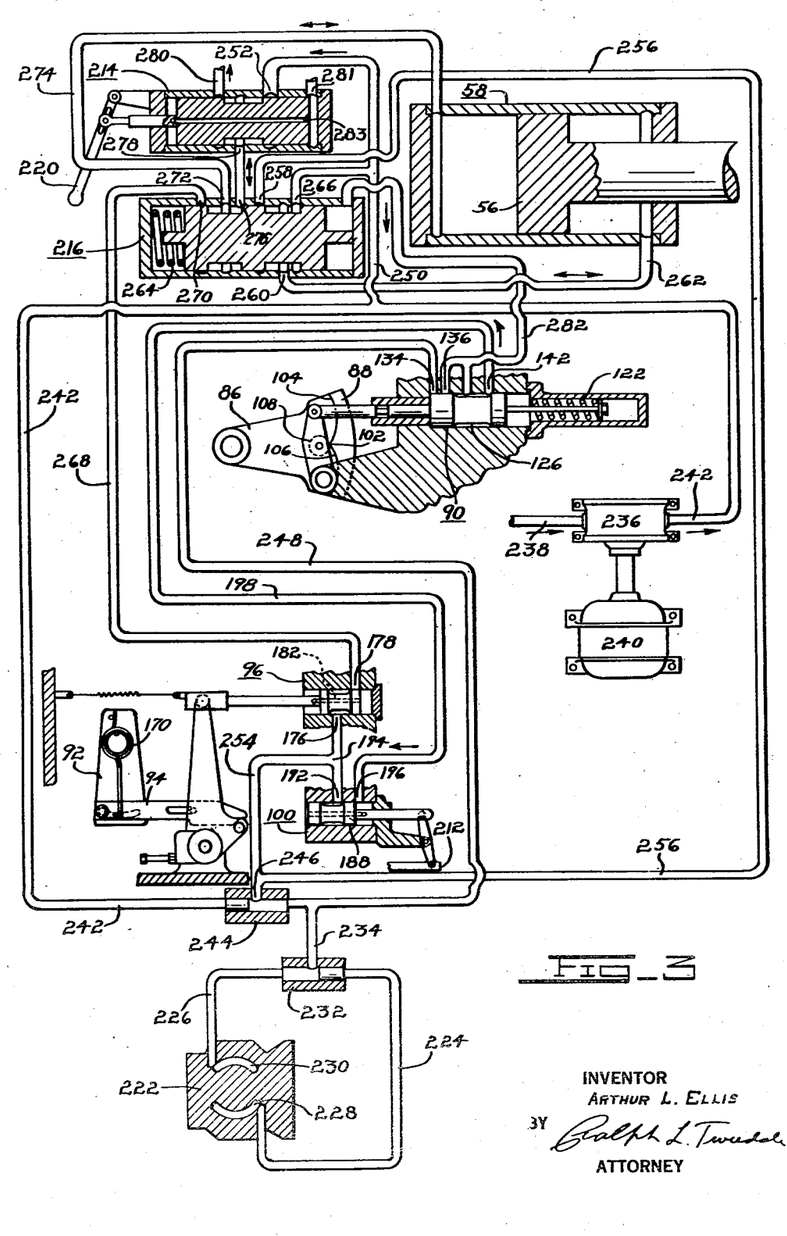

Alternatively the transmission may be operated under normal control of the pilot valve 214 instead of under the control of handwheel 44, if it is desired to drive the load continuously at a given rate of speed for considerable intervals. Thus, during normal operation, when there is no tendency to overload the prime mover, which is illustrated in Fig. 3, the valve 216 lies in its right-hand position, in which the small end of the cylinder 58 is constantly supplied with fluid under pressure through the conduit 262, ports 260 and 266, conduits 250 and 242, and pump 236. The large end of the cylinder 58 under these conditions is subject to control by the valve 214 through the conduit 274, and ports 272 and 276. Thus with the valve 214 in the position shown the port 278 is blocked and piston 56 is held stationary. With the valve 214 moved to the right, port 278 is connected with conduit 252 for admission of fluid under pressure from the auxiliary pump 236 to the large end of the cylinder 58 causing piston 56 to move to the right and thus moving the tilting box in a clockwise direction in Fig. 8, and increasing the speed of the "B-end" in a forward direction. When the valve 214 is moved fully to the left, the port 278 is connected to port 280, thus exhausting fluid from the large end of the cylinder 58 causing the piston 56 to move to the left under the constant pressure supplied to the small end of the cylinder 58. The speed of the "B-end" in a forward direction will therefore be reduced, or if the tilting box has been moved to the left past neutral position the speed in the opposite direction will be increased. During operation under normal control of valve 214 the handwheel 44 is free to turn with the "B-end" shaft 18. That is, with the pump "on stroke" in any given position, the member 20 and tilting box 16 will remain stationary while the gear 54 will rotate the gear 50 and nut 46 and carry along with them in their rotation the screw shaft 30, the head 34, the sleeve 36, and the handwheel 44, as a unit, without imparting longitudinal movement to the member 20.

Should an excessive resisting load be imposed upon the shaft 18 such that the prime mover connected to the shaft 66 would be overloaded, the constant horsepower valve 90 operates to move the tilting box 16 toward neutral position. It is a characteristic of hydraulic transmissions of the type described that the fluid pressure in the working circuit of the transmission itself varies in direct proportion to the torque load imposed upon the "B-end" shaft 18. When the shaft 18 is turning in one direction, one of the valve ports, for example 230, becomes the pressure port and the pressure existing in this port is transmitted to the conduit 226 and the shuttle valve 232. On rotation in the opposite direction the port 228 becomes the pressure port and the pressure therein is transmitted to conduit 224 and shuttle valve 232 which moves to the position opposite to that illustrated in Fig. 1. Any abnormal pressure rise that occurs in either valve port 228 or 230 is thus transmitted through conduits 234 and 248 to port 134 of the constant horsepower valve 90. When this pressure exceeds the value determined by the compression of the spring 122, the valve member 126 moves to the right opening port 136 and permitting the fluid to pass through conduit 282 to the power cylinder 284 of the valve 216. The opening of port 136 to pressure fluid from port 134 initiates a sequence of operations immediately causing a ratio of transmission to be established which will be safe for the particular overload imposed on the "B-end" shaft 18. That is, the mechanical advantage of the "A-end" shaft 14 over the "B-end" shaft 18 is increased to the point where the prime mover is not overloaded. The operation for this purpose is as follows:

Assuming that the tilting box is standing in a position for forward drive the piston 56 will be standing to the right of the mid-point of its travel as illustrated in Fig. 1. The directional control valve 96 will also be in the position illustrated in Fig. 1 in which fluid flow is cut off between the ports 176 and 178 and the port 178 is connected to the interior of the housing 78 which is maintained at atmospheric pressure by a connection to the expansion tank, not shown. The valve 216 having moved to the left, as illustrated, by the fluid pressure admitted to the power cylinder 284 by valve 90, connects the large end of control cylinder 58 to the tank through the conduit 274, port 272, port 270, conduit 268, port 178, and bore 182. The small end of the cylinder 58 is supplied with fluid under pressure either from the main power circuit of the transmission or from the auxiliary pump 236 depending upon the position of the shuttle valve 244. The circuit for this fluid is from the shuttle valve 244 through conduit 256, port 258, valve 216, port 260, and conduit 262 to cylinder 58. The piston 56 thus moves to the left until the ratio of transmission is such that the prime mover 66 may handle the overload without danger.

The compression of the spring 122 is varied by the cam 88 in accordance with the position of the tilting box 16 and the shape of the cam is such that the horsepower required at the shaft 66 when valve 90 opens is constant for all ratios of transmission. Since the horsepower transmitted by the hydraulic transmission is proportional to the product of the fluid pressure existing in the transmission and the speed of the "B-end" shaft, the cam 88 may be so shaped that the compression of the spring 122 will be maintained at the proper value for any speed ratio of transmission. Thus when the "B-end" shaft 18 is revolving slowly, the pressure which may be built up without exceeding the limiting horsepower is high. Since the position of the tilting box 16 is determinative of the speed of the shaft 18, it will be seen that when the tilting box 16 is near the neutral position the cam 88 holds the tension rod 118 to the left, as shown in Fig. 6, applying a relatively high force to the valve member 126. A relatively high pressure is therefore required to move the valve member 126 to the right under these conditions.

Conversely when the "B-end" shaft 18 is revolving at a high speed, much lower pressure in the system will produce an overload on the prime mover so that with the tilting box in a high speed position, as shown in Fig. 1, the cam 88 applies a smaller force to the valve member 126 permitting it to open on a much lower pressure. Thus the full horsepower of the prime mover may be utilized at low "B-end" speeds without danger of overloading the prime mover at high "B-end" speed.

Figure 2:
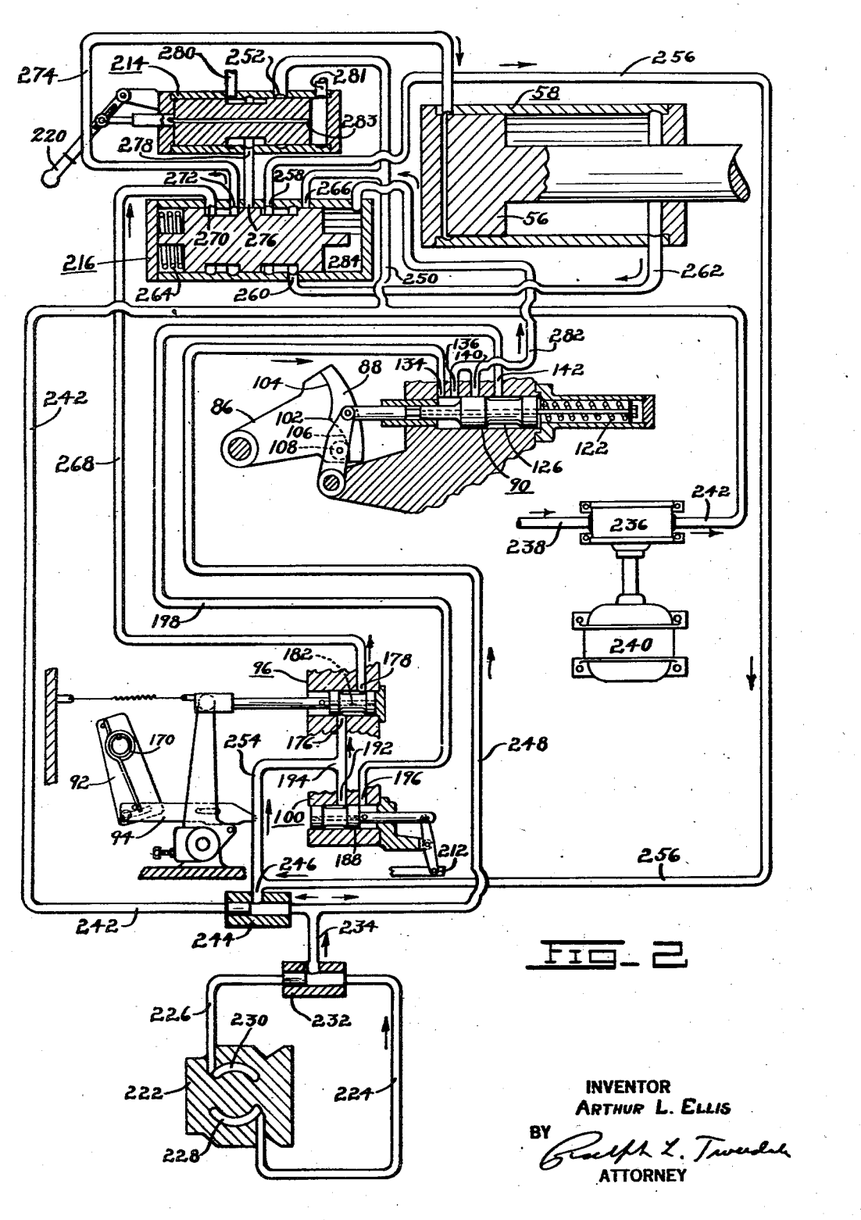
Figs. 2 and 3 are views corresponding to Fig. 1 showing the parts in different positions.

When the tilting box is in position for rotation of the "B-end" shaft 18 in the reverse direction, the parts take up the position illustrated in Fig. 2 wherein the piston 56 lies to the left of the mid-point of its travel and upon the occurrence of an overload it is necessary to move the piston to the right rather than to the left as previously described. The directional control valve 96 moves to the right during the first small increment of travel of the tilting box away from neutral position in a counter-clockwise direction in Fig. 1 and Fig. 8, and thereupon connects the port 270 of the valve 216 with the shuttle valve 244 through the conduits 268, 194 and 254. Fluid under pressure is thus admitted from either the main power circuit or from the auxiliary pump 236 to the large end of the cylinder 58 from port 272 through conduit 274. Thus, whenever the "B-end" shaft is rotating reversely and an overload occurs, the movement of valves 90 and 216 to the right and left respectively, admits fluid under pressure to both ends of the cylinder 58. Since the area of the piston 56 exposed to the left-hand end of the cylinder 58 is greater than the area exposed in the right-hand end, the resultant force tends to move the piston to the right toward neutral position until the mechanical advantage of the "A-end" shaft over the "B-end" shaft is increased sufficiently so that the prime mover may handle the overload imposed.

During operation with normal control exercised through valve 214, the operation of valve 90 causes this normal control to be temporarily interrupted since valve 216, in the position shown in Fig. 1, cuts off communication between conduit 276 and port 272. The cylinder 58 is thus cut off from any control influence by valve 214 until the valve 90 closes permitting valve 216 to move to the right into the position shown in Fig. 3. When normal control is exercised through valve 214, the handwheel 44 is free to turn with the "B-end" shaft 18; the shaft 30 and nut 46 turning together as a single unit at each particular setting of the control piston 56. When piston 56 moves, of course, the handwheel 44 speeds up or slows down relative to the "B-end" shaft 18 so long as piston 56 continues to push or pull the threaded shaft 30 into or out of the nut 46. During operation with normal control exercised through handwheel 44 instead of through valve 214, that is during operation with follow-up control, the valve 90 takes control away from handwheel 44 whenever safe loads are exceeded. This comes about from the fact that the effort exerted by piston 56 when valve 90 opens is greater than any effort which can be manually applied to handwheel 44. Accordingly when valve 90 opens, piston 56 moves toward neutral position as just described, bringing with it the shaft 30. In order to move, the shaft 30 must at least slow down relative to the "B-end" and may even stop or reverse. In any event the rotation of shaft 30 must be algebraically less than the rotation of the "B-end" shaft 18 and nut 46 in order to cause a difference in speeds which is made up by the translatory movement of shaft 30.

The control mechanism thus far described also operates to limit the horsepower which may be transmitted back through the transmission from the "B-end" shaft 18 to the "A-end" shaft 66. In other words, should the load tend to drive the prime mover, the horsepower which may be transmitted backward through the transmission is limited to the same value that may be transmitted therethrough in the normal direction. Operation under these conditions is identical to that previously described, the only difference being that if the port 230, for example, be the pressure port when power is transmitted normally through the transmission for a given direction of rotation of the shaft 18, then the port 228 becomes the pressure port when the load tends to feed power back to the prime mover. Since the occurrence of an abnormal pressure rise in either port causes movement of the tilting box 16 toward neutral position, it will be seen that an excessive amount of power feed-back will reduce the mechanical advantage of the "B-end" shaft 18 upon the "A-end" shaft, thus slowing down the "B-end" shaft and reducing the horsepower transmitted back to the "A-end" shaft.

When the transmission is operated manually by the crank 76, as when a failure of the prime mover occurs, the horsepower which may be transmitted through the transmission is limited by the constant torque valve 100. Rotation of the crank 76 drives the shaft 286 which drives the flywheel 298 at a higher rate of speed through the planetary gearing 292, 294, 296 for steadying the speed of operation of the shaft 286, and also drives the sprocket 316 through the clutch 304 and through the spring-loaded cam mechanism 312, 314. Upon the occurrence of an overload sufficient to require an excessive torque upon the crank 76, the sprocket 316 slips relative to the hub 306 causing the projection 312 to travel along the cam surface 314 compressing the springs 310. As soon as the projection 312 has travelled along the cam surface 314 a predetermined distance, the torque required for further travel exceeds the torque which the clutch 304 is capable of transmission and thereafter the clutch 304 slips until the torque required falls off to a safe value.

The movement of the cam member 308 to the left caused by the cam 314 actuates the fork 320 to pull the operating rod 212 to the left in Figs. 1 and 8, thus moving the valve member 188 to the right and connecting port 196 to port 192 instead of to the tank. Fluid under pressure is thus admitted from the shuttle valve 244 through the ports 192 and 196, conduit 198, ports 142 and 140 and the conduit 282 to the power cylinder 284, moving valve 216 to the left-hand position illustrated in Fig. 1. The piston 56 is thus caused to move toward neutral position in the manner previously described in connection with the constant horsepower valve 90.

Thus, assuming that the crank 76 is operated at a substantially constant speed, the occurrence of an excessive load at the "A-end" shaft 14 tends to increase the mechanical advantage of the "A-end" shaft 14 over the "B-end" shaft 18 until the ratio of power transmission is such that the overload may be safely handled at the crank 76. Since the power delivered to the crank 76 is ordinarily less than that of the prime mover, the constant horsepower valve 90 will not operate for limiting loads which are excessive when the transmission is driven from the crank 76. In other words, it is desirable that the settings of the operating mechanism for the constant horsepower valve 90 and the operating mechanism for the torque limiting valve 100 be such that the valve 100 comes into operation at a much lower load on the shaft 18 than does the constant horsepower valve 90. The operation of the constant torque valve is subject to the directional control valve 96 in the same manner as is the constant horsepower valve 90. Thus, whenever the tilting box lies on the counter-clockwise side of neutral position in Fig. 8, valve 96 will lie to the right in Fig. 1 and connect the large end of cylinder 58 to pressure fluid whenever valve 216 is moved to the left by pressure fluid from valve 100. This circuit is through conduit 254, port 176, valve 96, port 178, conduit 268, port 270, valve 216, port 272 and conduit 274. The greater area of the large end of cylinder 58 is thus predominant over the area at the small end and piston 56 is thereby moved to the right toward neutral position.

It will thus be seen that the present invention provides a control device for a variable speed transmission whereby the transmission itself will automatically prevent the overloading of its prime mover regardless of the resisting load applied to the driven member of the transmission.

While the form of embodiment of the invention as herein disclosed, constitutes a preferred form, it is to be understood that other forms might be adopted, all coming within the scope of the claims which follow.

What is claimed is as follows:

1. In a power transmission device the combination of a driving shaft, a driven member, a variable speed hydraulic transmission for delivering power from the driving shaft to the driven member, a member movable to vary the mechanical advantage of the driving shaft upon the driven member, follow-up control means for normally determining the position of said member, fluid pressure operated means for moving said movable member, a valve responsive to excessive fluid pressure in the hydraulic transmission for controlling the fluid pressure operated means, and means for increasing the pressure response of said valve in accordance with changes in the position of the movable member tending toward increased mechanical advantage.

2. In a power transmission device the combination of a driving shaft, a driven member, a variable speed hydraulic transmission for delivering power from the driving shaft to the driven member, a member movable to vary the mechanical advantage of the driving shaft upon the driven member, control means for normally determining the position of said member, fluid pressure operated means for moving said movable member to increase said mechanical advantage upon excessive pressure being developed within the hydraulic transmission, and means for operating the first mentioned means in response to pressure so as to maintain a predetermined maximum value for the product of fluid pressure and driven member velocity.

3. In a power transmission device the combination of a driving shaft, a driven member, a reversible variable speed power transmission for delivering power from the driving shaft to the driven member and including means forming a source of pressure fluid, a member movable in either direction away from a neutral position for varying the speed and direction of the driven member relative to that of the driving member, means including a differential piston and cylinder for operating said movable member, a valve for controlling the admission of fluid from said source to both ends of said cylinder and a second valve for cutting off fluid from the large end of the cylinder in cooperation with the first mentioned valve and means for operating the second valve as the movable member passes through the neutral position.

4. In a power transmission device the combination of a driving shaft, a driven member, a reversible variable speed power transmission for delivering power from the driving shaft to the driven member, a member movable in either direction away from a neutral position for varying the speed and direction of the driven member relative to that of the driving member, means including a differential piston and cylinder for operating said movable member, a valve selectively operable to cause the flow of pressure fluid to move said piston and a second valve operable to selectively determine the direction of movement of the piston under the influence of first mentioned valve, and means for operating the second valve as the movable member passes through the neutral position, said last named means including a cam operable by said movable member to actuate the valve through its full stroke by a slight movement of the movable member.

5. In a power transmission device the combination of a driving shaft, a driven member, a reversible variable speed power transmission for delivering power from the driving shaft to the driven member, a member movable in either direction away from a neutral position for varying the speed and direction of the driven member relative to that of the driving member, means including a differential piston and cylinder for operating said movable member, a valve for controlling the admission of fluid to both ends of said cylinder, a second valve for cutting off fluid from the large end of the cylinder in cooperation with the first mentioned valve, means for operating the second valve as the movable member passes through the neutral position, said last named means including a cam operable by said movable member to actuate the valve through its full stroke by a slight movement of the movable member, and a lost motion connection between the cam and the movable member.

6. In a power transmission device the combination of a driving shaft, a driven member, a reversible variable speed power transmission for delivering power from the driving shaft to the driven member, a member movable in either direction away from a neutral position for varying the speed and direction of the driven member relative to that of the driving member, means including a fluid motor for operating said member, a valve selectively operable to cause flow of pressure fluid to move said motor, a second valve in series with the first valve for selectively determining the direction of fluid flow to or from the motor, and means for shifting the second valve as the movable member passes through neutral position.

7. In a power transmission device the combination of a driving shaft, a driven member, a variable speed hydraulic transmission for delivering power from the driving shaft to the driven member, a member movable to vary the mechanical advantage of the driving shaft upon the driven member, means responsive to the pressure in said transmission for moving said member, and means movable with said member for increasing the pressure response of said means as the member is moved toward the position of maximum mechanical advantage.

8. In a variable speed fluid power transmission device the combination of a variable displacement pump, a fluid motor driven by the pump, means for driving the pump, means for regulating the pump displacement in response to pressure changes produced at the fluid motor and means for increasing the response of the regulating means in accordance with decreases in the displacement of the pump.

9. In a power transmission device the combination of a driving shaft, a driven member, a variable speed hydraulic transmission for delivering power from the driving shaft to the driven member, a member movable to vary the mechanical advantage of the driving shaft upon the driven member, control means for normally determining the position of said member, means for moving said movable member to increase said mechanical advantage upon excessive pressure being developed within the hydraulic transmission, said means responding to higher pressures at lower speeds of the driven member.

10. In a power transmission system the combination of a driving shaft, a driven member, a variable speed power transmission including a pump operable from the driving shaft, a motor operable by fluid delivered by the pump and connected to actuate the driven member, locally operable manual means for controlling the flow of fluid from the pump to the motor, additional means for controlling the flow of fluid from the pump to the motor and including a servo-motor and a pilot control valve therefor, protective means including a valve connected to exercise control over said servo-motor during overload independently of the other controlling means, and torque responsive means for operating said valve.

11. In a power transmission system the combination of a driving shaft, a driven member, a variable speed power transmission including a pump operable from the driving shaft, a motor operable by fluid delivered by the pump and connected to actuate the driven member, locally operable manual means for controlling the flow of fluid from the pump to the motor, additional means for controlling the flow of fluid from the pump to the motor and including a servo-motor and a pilot control valve therefor, and protective means including a valve connected to exercise control over said servo-motor during overload independently of the other controlling means, and pressure responsive means for operating said valve.

12. In a power transmission system the combination of a driving shaft, a driven member, a variable speed power transmission including a pump operable from the driving shaft, a motor operable by fluid delivered by the pump and connected to actuate the driven member, locally operable manual means for controlling the flow of fluid from the pump to the motor, additional means for controlling the flow of fluid from the pump to the motor and including a servo-motor and a pilot control valve therefor, and protective means including a valve connected to exercise control over said servo-motor during overload independently of the other controlling means, and means for operating said valve in response to pressure so as to maintain a predetermined maximum value for the product of fluid pressure and driven member velocity.

13. In a power transmission device the combination of a driving shaft, a driven member, a variable speed hydraulic transmission for delivering power from the driving shaft to the driven member, a member movable to vary the mechanical advantage of the driving shaft upon the driven member, control means for normally determining the position of said member, means for moving said movable member to increase said mechanical advantage upon excessive pressure being developed within the hydraulic transmission and including means for disconnecting said normal control means.

14. In a power transmission device the combination of a driving shaft, a driven member, a variable speed hydraulic transmission for delivering power from the driving shaft to the driven member, a member movable to vary the mechanical advantage of the driving shaft upon the driven member, control means for normally determining the position of said member, means for moving said movable member to increase said mechanical advantage upon excessive pressure being developed within the hydraulic transmission and including means for disconnecting said normal control means, and means for increasing the pressure response of the second mentioned means in accordance with decreases in the speed of the driven member.

15. In a power transmission device the combination of a driving shaft, a driven member, a variable speed hydraulic transmission for delivering power from the driving shaft to the driven member, a member movable to vary the mechanical advantage of the driving shaft upon the driven member, control means normally connected to operate said member and means responsive to the pressure in said transmission for moving said member and including means for disconnecting said normal control means.

16. In a power transmission device the combination of a driving shaft, a driven member, a variable speed hydraulic transmission for delivering power from the driving shaft to the driven member, a member movable to vary the mechanical advantage of the driving shaft upon the driven member, control means normally connected to operate said member and means responsive to the pressure in said transmission for moving said member, and including means for disconnecting said normal control means, and means movable with said member for varying the pressure response of said means.

ARTHUR L. ELLIS.